United States Patent [19]

Ushiki et al.

[11] Patent Number: 5,349,514
[45] Date of Patent: Sep. 20, 1994

[54] REDUCED-RESONANT-CURRENT ZERO-VOLTAGE-SWITCHED FORWARD CONVERTER USING SATURABLE INDUCTOR

[75] Inventors: Shuichi Ushiki; Ryoji Saito, both of Tokyo, Japan

[73] Assignee: Origin Electric Company, Limited, Tokyo, Japan

[21] Appl. No.: 963,195

[22] Filed: Oct. 19, 1992

[30] Foreign Application Priority Data

Nov. 1, 1991 [JP] Japan .................................. 3-313308

[51] Int. Cl.⁵ ............................................ H02M 3/335
[52] U.S. Cl. ........................................ 363/21; 363/97; 363/131
[58] Field of Search ...................... 363/20, 21, 97, 131

[56] References Cited

U.S. PATENT DOCUMENTS

| | | | |
|---|---|---|---|
| 4,399,376 | 8/1983 | Onodera et al. | 363/20 |
| 4,417,153 | 11/1983 | Onodera et al. | 363/20 |
| 4,435,746 | 3/1984 | Barnett | 363/21 |
| 4,977,493 | 12/1990 | Smith | 363/126 |
| 5,079,689 | 1/1992 | Gidon et al. | 363/131 |
| 5,086,381 | 2/1992 | Kameyama et al. | 363/16 |
| 5,126,931 | 6/1992 | Jitaru | 363/97 |

FOREIGN PATENT DOCUMENTS 4-165956  6/1992  Japan ............................ H02M 3/28

OTHER PUBLICATIONS

Hua et al., "An Improved Zero-Voltage-Switched PWM Converter Using a Saturable Inductor" 22nd Annual IEEE Power Electronics Specialists Conference, Apr. 1991
"Reduced-Resonant-Current Zero-Voltage-Switched Forward Converter with Unsaturated-Region Resonance of Saturable Inductor", by Ryoji Saito, Feb. 1992.

Primary Examiner—Jeffrey L. Sterrett
Attorney, Agent, or Firm—Lowe, Price, Leblanc & Becker

[57] ABSTRACT

A resonant forward converter comprises a saturable inductor connected in series to a primary winding of a transformer and a switching device. The saturable inductor has a predetermined value of inductance in a light current region and a small value of inductance at a predetermined integral voltage due to magnetic saturation.

10 Claims, 6 Drawing Sheets

→ TIME (t)

REDUCED-RESONANT-CURRENT ZERO-VOLTAGE-SWITCHED FORWARD CONVERTER USING SATURABLE INDUCTOR

BACKGROUND OF THE INVENTION

The present invention relates to a resonant forward converter for switching a switching device in a state that applied voltage is substantially zero.

In recent years, to reduce switching power loss by junction capacitance of a switching device, a zero-voltage-switching technique for switching the switching device in a state that applied voltage is substantially zero has been applied to power converters. Prior art quasi-resonant converter with a resonance on the primary side and multi-mode resonant converter with resonances on the primary and secondary sides which carry out zero voltage switching can reduce switching power loss in the switching device. However, since voltage of the switching device becomes excessively high when load current increases, and resonant current in the circuit becomes heavy, the above converters need to use large capacity electronic parts including the switching device, resulting in a problem of increased power loss therein.

Referring to FIG. 8, this problem will be described in connection with a prior art resonant converter, wherein 1 designates a DC power supply, 2 designates a transformer including a primary winding 2A and a secondary winding 2B, each having the polarity as illustrated in FIG. 8, 3 designates a switching device comprising a MOSFET or a bipolar transistor, and 4 designates a resonant capacitor connected in parallel to the switching device 3. Resonant linear inductance is a sum of inductance Lr corresponding to a sum of inductance of wiring and leakage inductance of the transformer 2, and inductance of an individual linear inductor 5'. A rectifier diode 6 is connected in series to the secondary winding 2B of the transformer 2. A free wheeling diode 7 is interposed between one end of the secondary winding 2B of the transformer 2 and one end of the rectifier diode 6. An output filter comprising a smoothing inductor 8 and a smoothing capacitor 9 is interposed between the free wheeling diode 7 and output terminals 10, 10'. A resonant capacitor 11 is connected in parallel to the secondary winding 2B of the transformer 2. A control circuit 12 is arranged to provide control signals to the switching device 3 so as to maintain DC output voltage across the output terminals 10, 10', at a set value.

The prior art resonant converter, which is not described in detail here, is characterized that zero voltage switching is realizable in a wide current range without making voltage across the switching device 3 upon turning-off excessively high when load current increases. FIG. 9 shows typical operation waveforms of this resonant converter.

However, to obtain zero voltage switching as shown in FIG. 9, resonant current in the forward direction should be increased in response to a flow of resonant current in the backward direction, requiring heavy resonant current to thereby increase loss in the circuit, resulting in a decrease in efficiency. Particularly, the ratio of resonant current to output current increases upon low load, lowering power efficiency remarkably.

The greater a value of resonant linear inductance is, the smaller a value of the resonant capacitor 4 can be. Thus, resonant current can be reduced, whereas output power is also reduced. The ratio L/C should be set to a value corresponding to output power, and the resonant capacitor 4 should have large capacitance to meet a desired resonance operation and output characteristic, so that charging and discharging current of the resonant capacitor 4 becomes heavy as described above. Therefore, switching loss in the switching device 3 is fully reduced by zero voltage switching, whereas due to an increase in current passing through the switching device 3, resonant linear inductance, and the windings of the transformer 2, power loss is increased, lowering power efficiency.

Therefore, it is an object of the present invention to provide a resonant forward converter which contributes to improvement in power efficiency by realizing zero voltage switching in a wide range of load current without excessively high voltage across a switching device.

It is another object of the present invention to provide a resonant forward converter capable of adopting a small resonant capacitance with a largely reduced charging/discharge current passing therethrough, and reducing circulating current.

SUMMARY OF THE INVENTION

There is provided, according to an aspect of the present invention, a resonant forward converter, comprising:
a DC power supply;
a transformer having a primary winding connected in series to said DC power supply and a secondary winding magnetically coupled with said primary winding;
a switching device connected in series to said primary winding of said transformer;
a resonant capacitance connected in parallel to said switching device;
a saturable inductor connected in series to said primary winding of said transformer and said switching device, said saturable inductor having a predetermined value of inductance in a light current region and a small value of inductance at a predetermined integral voltage due to magnetic saturation;
a rectifier diode connected in series to said secondary winding of said transformer;
a free wheeling diode interposed between one end of said secondary winding of said transformer and one end of said rectifier diode;
an output filter connected in parallel to said free wheeling diode; and
a control circuit means for providing a control signal to said switching device to control a conduction thereof.

DETAILED DESCRIPTION OF THE INVENTION

Figure 1:
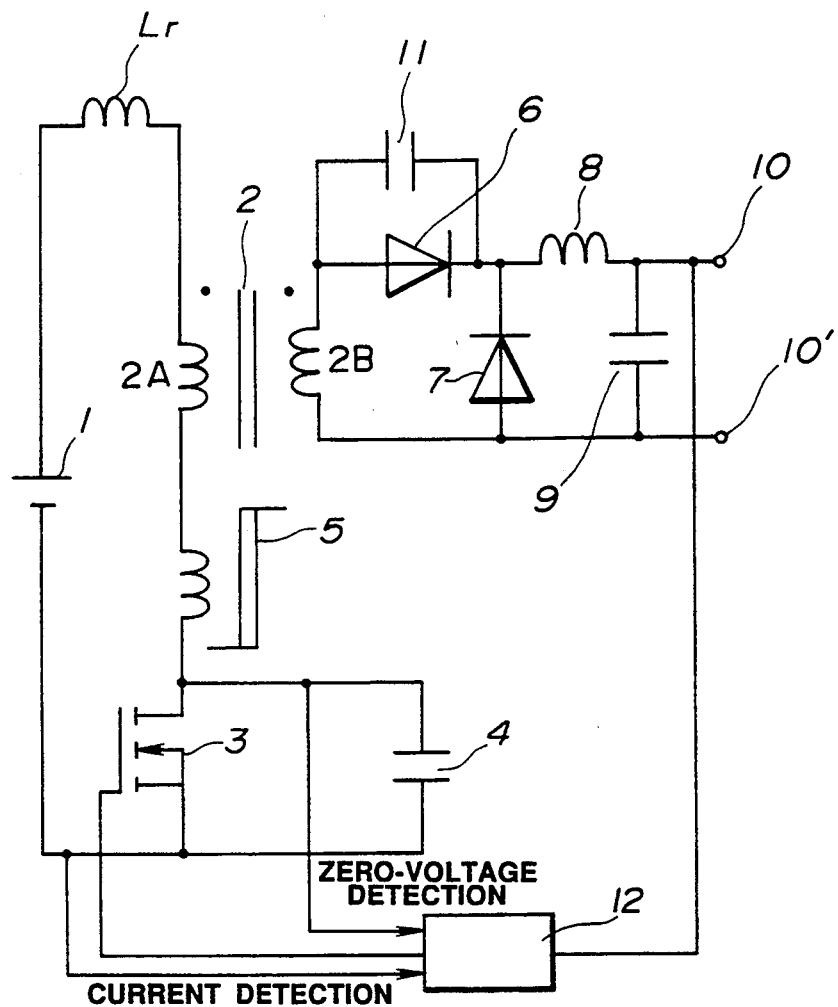
FIG. 1 is a circuit diagram showing a preferred embodiment of a resonant forward converter according to the present invention.
Figure 2:
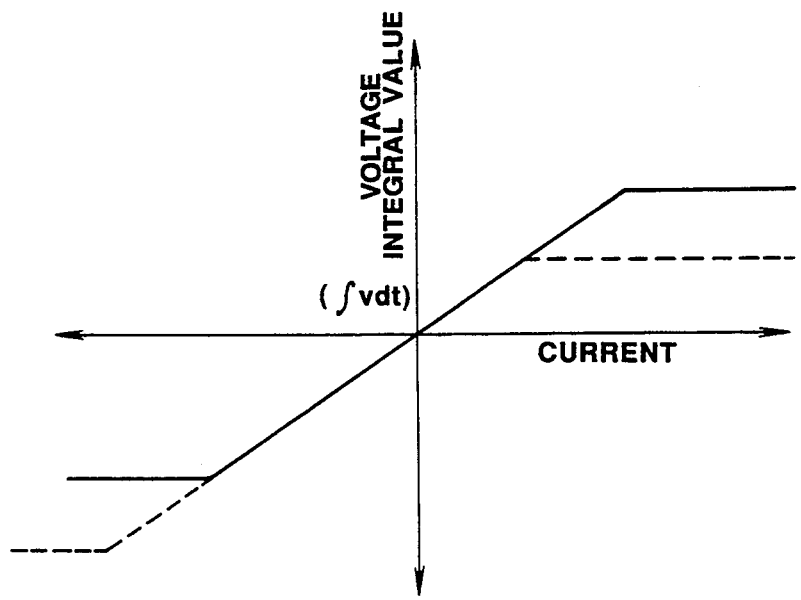
FIG. 2 is a graphic chart showing a characteristic of a saturable inductor applied to the resonant forward converter.

Referring to FIGS. 1–9, wherein like reference numerals designate corresponding parts throughout the views, referring particularly to FIG. 1, Lr designates inductance corresponding to a sum of inductance of wiring and leakage inductance of the transformer 2 which provide a part or an entirety of resonant inductance, and 5 designates a saturable inductor which is one of main component parts of the present invention and has a characteristic as illustrated in FIG. 2. This saturable inductor 5 is constructed to provide large inductance to the circuit during a period of resonance of light current passing from a positive electrode of the DC power supply 1 to the primary winding 2A of the transformer 2 and the saturable inductor 5 upon turning-off of the switching device 3, and to be magnetically saturated so as to reduce quickly that inductance upon turning-on of the switching device 3.

Therefore, if inductance of the saturable inductor 5 upon non-saturation serves as resonant inductance in addition to inductance Lr, resonant inductance can be largely increased as compared with the prior art, whereas capacitance of the resonant capacitor 4 can be largely decreased as compared with the prior art, e.g., by less than 0.1 times. When using conversion frequency in a MHz range, a desired capacitance can be obtained only by output capacitance of the switching device 3 without the resonant capacitor 4. If resonant capacitance is small, resonant current is also small, enabling a reduction in power loss due to resonant current.

The control circuit 12 is arranged to detect DC output voltage across the DC output terminals 10, 10', and provide control signals to the switching device 3 to put that voltage constant, the control signals providing any of on-time control, off-time control, turn-on time control, and on-time control based on current mode control by intervening a main current value, or the combination thereof.

Figure 3:
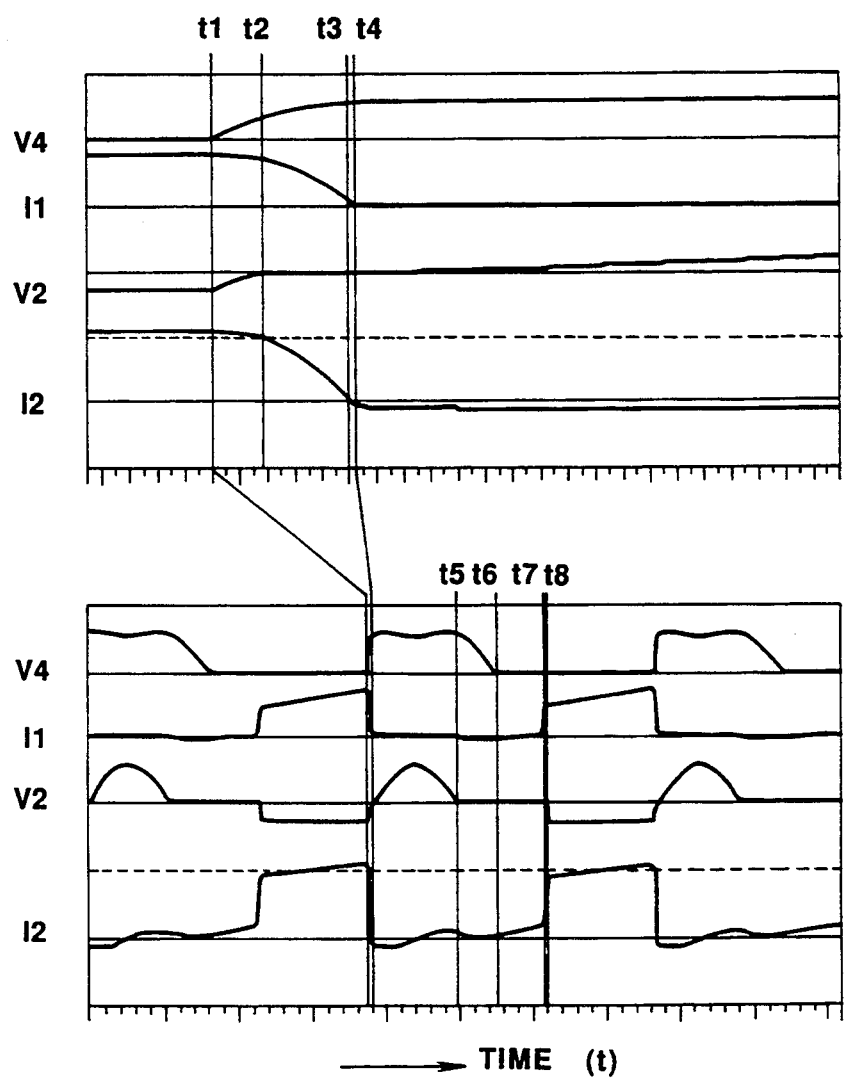
FIG. 3 is a waveform chart of several portions of the preferred embodiment.

Referring also to FIG. 3, to promote a better understanding of the foregoing, one of typical operation modes of the present invention will be described. A description will be made hereinafter that the saturable inductor 5 is saturated at a predetermined current value, but to be exact, it is magnetically saturated in response to a voltage integral value obtained by integrating applied voltage by a time by a constructive means. However, since a current value exists corresponding to this voltage integral value, the operation in one steady state is equivalent to the following if this current value is considered to be an apparent saturated current value.

It is to be noted that, in FIG. 3, V4 is a waveform of voltage across both ends of the switching device 3, i.e., voltage across both ends of the resonant capacitor 4, I1 and I2 are waveforms of currents passing through the primary winding 2A and the secondary winding 2B of the transformer 2, respectively, and V2 is a waveform of voltage across both ends of the secondary winding 2B of the transformer 2.

Stage 1 ($t0 \leq t \leq t1$):

The switching device 3 is in an ON state, and the saturable inductor 5 is in a state of magnetic saturation. At that time, the switching device 3 receives current equal to a sum of reflected current on the primary side of current of the inductor 8 on the secondary side, and exciting current of the transformer 2.

Stage 2 ($t1 \leq t \leq t2$):

When the switching device 3 is turned off at a time t1, current which has passed through the switching device 3 flows into the resonant capacitor 4. Thus, the resonant capacitor 4 is charged to quickly increase voltage V4 between terminals thereof. As soon as voltage V4 is equal to voltage V1 of the DC power supply 1, voltage applied to the windings of the transformer 2 becomes zero. During this period of time, voltage V4 across the resonant capacitor 4 increases substantially linearly for the following reasons: Since the inductor 8 has generally a fully large value for DC smoothing and receives substantially constant current during this period of time, whereas exciting current of the transformer 2 varies few during this period of time, charging current of the resonant capacitor 4 becomes substantially constant. When voltage across the windings of the transformer 2 is zero, the free wheeling diode 7 which has inversely been biased by that voltage becomes in conduction, so that the free wheeling diode 7 and the rectifier diode 6 put the secondary winding 2B of the transformer 2 in a short-circuit state. Suppose that this time is t2.

Stage 3 ($t2 \leq t \leq t3$):

Since the secondary winding 2B of the transformer 2 is short-circuited at the time t2, exciting current of the transformer 2 is kept substantially constant during this period of time. Charging current flowing into the resonant capacitor 4 starts to decrease since load current starts to shift to the free wheeling diode 7 due to conduction thereof, but it does not become zero immediately since there exist inductance Lr corresponding to a sum of inductance of wiring and leakage inductance of the transformer 2, and saturated inductance Lss of the saturable inductor 5 (equal to or smaller than the level of Lr). Resonance determined by a sum of these inductances and the resonant capacitor 4 makes voltage V4 across the resonant capacitor 4 continue to increase further, whereas it makes current I1 charging the resonant capacitor 4 decrease. When this charging current decreases up to a value of exciting current of the transformer 2, the rectifier diode 6 is turned off to release the secondary winding 2B of the transformer 2 from a short-circuit state. Suppose that this time is t3.

Stage 4 ($t3 \leq t \leq t4$):

When the rectifier diode 6 is turned off to release the secondary winding 2B of the transformer 2 from a short-circuit state, exciting inductance Lm of the transformer 2, saturated inductance Lss of the saturable inductor 5, the resonant capacitor 4, the resonant capacitor 11 on the secondary side, and inductance Lr corresponding to a sum of inductance of wiring and leakage inductance of the transformer 2 form a resonant circuit.

With this resonance, voltages across the resonant capacitors 4, 11 vary.

Next, as soon as current of the saturable inductor 5 decreases up to a magnetic saturation current value, the saturable inductor 5 gets out of a state of magnetic saturation, and inductance thereof changes into non-saturated inductance Lsn and has a large value on the same level as exciting inductance of the transformer 2. Suppose that a time that the saturable inductor 5 gets out of a state of magnetic saturation is t4.

Stage 5 (t4≦t≦t5):

When the saturable inductor 5 gets out of a state of magnetic saturation at the time t4, exciting inductance Lm of the transformer 2, non-saturated inductance Lsn of the saturable inductor 5, the resonant capacitor 4, the resonant capacitor 11 on the secondary side, and inductance Lr corresponding to a sum of inductance of wiring and leakage inductance of the transformer 2 form a resonant circuit. With this resonance, the resonant capacitors 4, 11 are charged and discharged, so that voltages across the capacitors 4, 11 vary.

When voltage across the resonant capacitor 11 of the rectifier diode 6 is zero due to charging and discharging thereof, the rectifier diode 6 becomes in conduction, so that the secondary winding 2B of the transformer 2 is short-circuited by the rectifier diode 6 and the free wheeling diode 7. Suppose that this time is t5.

Stage 6 (t5≦t≦t6):

When the windings of tile transformer 2 are short-circuited at the time t5, non-saturated inductance Lsn of the saturable inductor 5, the resonant capacitor 4, and inductance Lr corresponding to a sum of inductance of wiring and leakage inductance of the transformer 2 form a resonant circuit. With this resonance, the resonant capacitor 4 is discharged further. Up to the time t5, energy stored in the non-saturated inductance of the saturable inductor 5 as current in the discharge direction of the resonant capacitor 4 makes the resonant capacitor 4 continue to discharge.

As soon as voltage across the resonant capacitor 4 is zero, an inverse parallel diode of the switching device 3 (in case of MOSFET, its body diode) becomes in conduction. Suppose that this time is t6.

Stage 7 (t6≦t≦t7):

If the switching device 3 is turned on while the body diode of the switching device 3 or the diode connected in parallel therewith is in conduction, it is possible to realize turn-on switching in a state that applied voltage is zero. In this operation mode, since, at the time t5, the rectifier diode 6 has been already in conduction to short-circuit the windings of the transformer 2, the saturable inductor 5 bears the large portion of voltage V1 of the DC power supply 1, so that current increases linearly in the forward direction. When this current reaches a saturation current value, the saturable inductor 5 comes to magnetic saturation. Suppose that this time is t7. During this period of time, power is not supplied to the output. However, since the secondary winding 2B of the transformer 2 is short-circuited, there is no variation in magnetic flux of the transformer 2, causing no increase in burden of voltage to the transformer 2.

Stage 8 (t7≦t≦t8):

When the saturable inductor 5 is magnetically saturated at the time t7, inductance Lr corresponding to a sum of inductance of wiring and leakage inductance of the transformer 2, and saturated inductance Lss of tile saturable inductor 5 bear all voltage V1 of the DC power supply 1. Since a sum of inductances Lr and Lss is small, currents of the switching device 3 and the rectifier diode 6 increase quickly. When current of the rectifier diode 6 is equal to current of the inductor 8 at a time t8, the free wheeling diode 7 is inversely biased, and turned off. With the free wheeling diode 7 turned off, reflected voltage of voltage V1 of the DC power supply 1 appears across the secondary winding 2B of the transformer 2, supplying power from the DC power supply 1 to the secondary side via the switching device 3, the transformer 2, and the rectifier diode 6.

Thereafter, the operation mode returns to the stage 1 to repeatedly carry out the same operation as described above. Waveforms of the above several portions of the resonant forward converter are shown in FIG. 3. This operation is not described here since except for a possible small difference in order of the stages, etc. due to a difference in constants of circuit parts to be used, it is the same in fundamentals which constitute the features of the resonant forward converter: By exploiting the magnitude of a value of non-saturated inductance Lsn of the saturable inductor 5, the direction of current is reversed during a period of resonance to store energy, by which zero voltage switching is realized.

As described above, in this embodiment, both the switching device 3 and the rectifier diode 6 can be turned on and off at zero voltage. Additionally, since resonance during an OFF period of the switching device 3 which realizes zero voltage switching exploits inductance Lsn in a non-saturation region of the saturable inductor 5 inserted in the primary side which can be increased, a value of the resonant capacitor 4 in parallel with the switching device 3 and a value of the resonant capacitor 11 in parallel with the rectifier diode 6 can be decreased. In case of operation at conversion frequency in a MHz range, only output capacitance comprising junction capacitance of the switching device 3, etc. is sufficient for resonant capacitance without the resonant capacitor 4. Therefore, resonant current is as small as exciting current of the transformer of the prior art non-resonant forward converter, and thus currents of the switching device 3, the windings of the transformer 2, and the rectifier diode 6 are similar to that ones in the prior art non-resonant forward converter, causing few increase in circuit current for realizing zero voltage switching relative to load current in a wide range, resulting in a high frequency and high efficiency converter.

Further, with the resonant forward converter of the present invention, resonant capacitance can largely be reduced, enabling shortening of the resonance time in accordance with an increase in load current. That is, if load current increases, the resonance operation of inductance Lr corresponding to a sum of inductance of wiring and leakage inductance of the transformer 2, saturated inductance Lss of the saturable inductor 5, and the resonant capacitor 4 makes an OFF period of the switching device 3 to shorten, and an ON period thereof to lengthen, resulting in a self compensation of a reduction output voltage in accordance with an increase in load current.

Furthermore, since resonant capacitance can largely be reduced, inductance Lr in the resonant circuit operates effectively to shorten the reset time of the resonant circuit.

Still further, if capacitance including the resonant capacitor 11 on the secondary side, and resonant inductance are appropriately established, a peak voltage part of the switching device 3 can be flattened as shown in FIG. 3, enabling shortening of the reset time of the resonant circuit in restricting the peak of voltage to be applied to the switching device 3.

Figure 4:
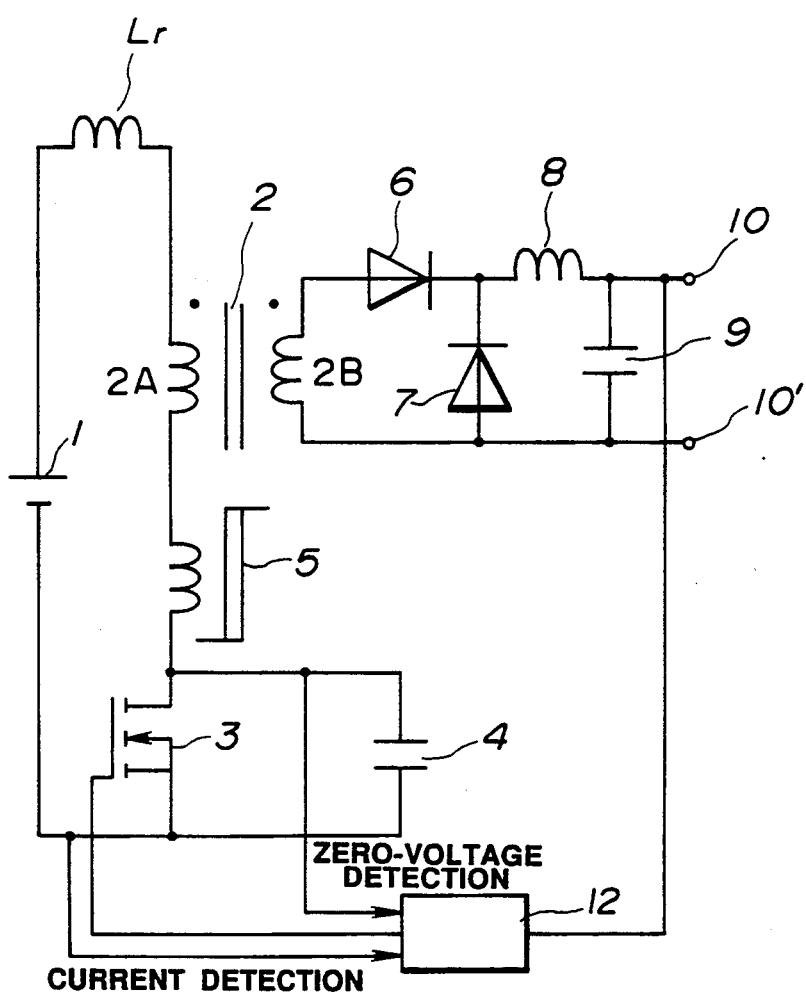
FIG. 4 is a view similar to FIG. 1, but showing another preferred embodiment of a resonant forward converter according to the present invention.
Figure 5:
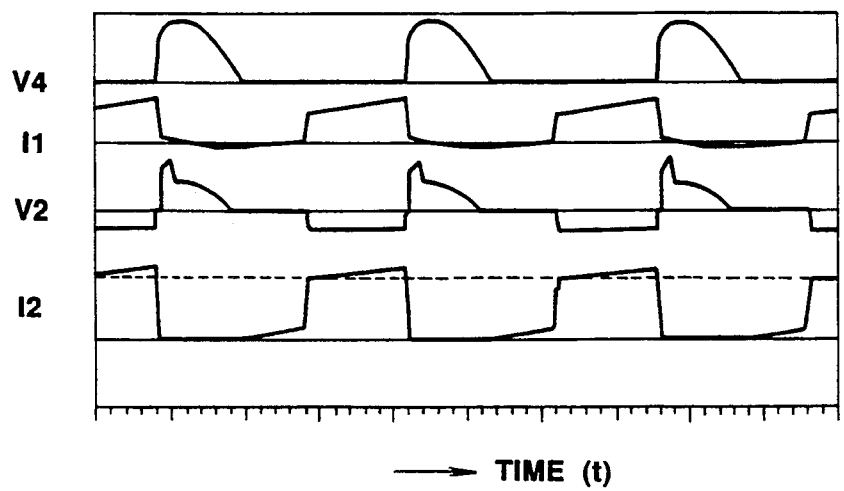
FIG. 5 is a view similar to FIG. 3, but of several portions of the another preferred embodiment.

Referring next to FIG. 4, in another preferred embodiment of the present invention, the resonant capacitor 11 on the secondary side is eliminated, so that upon turn off, the rectifier diode 6 is not turned off at zero voltage. FIG. 5 shows typical operation waveforms of this converter. Since junction capacitance of the rectifier diode 6 is small, this embodiment is suitable for the operation at conversion frequency that the switching device 3 has only to be switched at zero voltage. The operation of this embodiment is not described since except for no generation of resonance on the secondary side, it is substantially the same in essentials which constitute the features of the present invention as the embodiment as shown in FIG. 1: The switching device on the primary side is switched at zero voltage.

Figure 6:
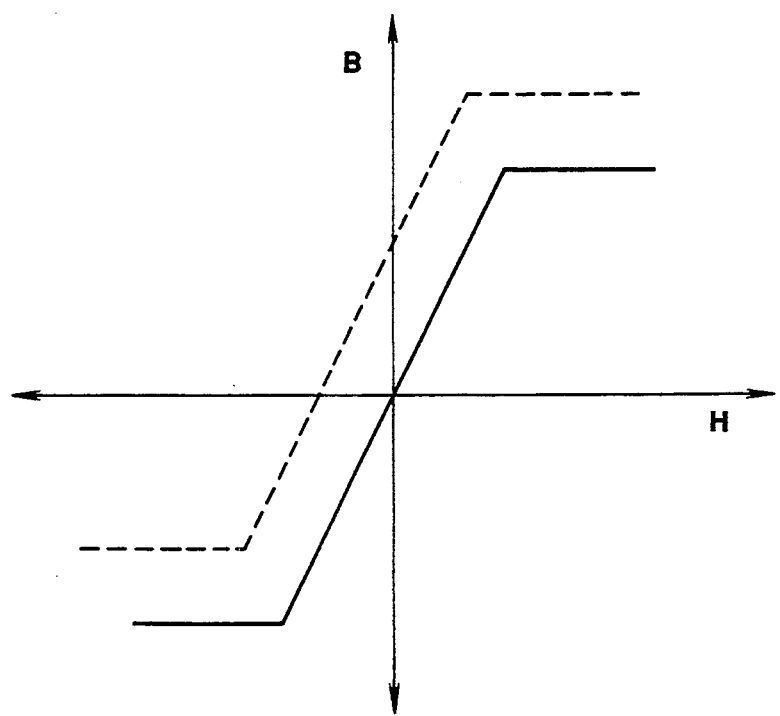
FIG. 6 is a view similar to FIG. 2, but showing a characteristic of a core applied to the saturable inductor.
Figure 7:
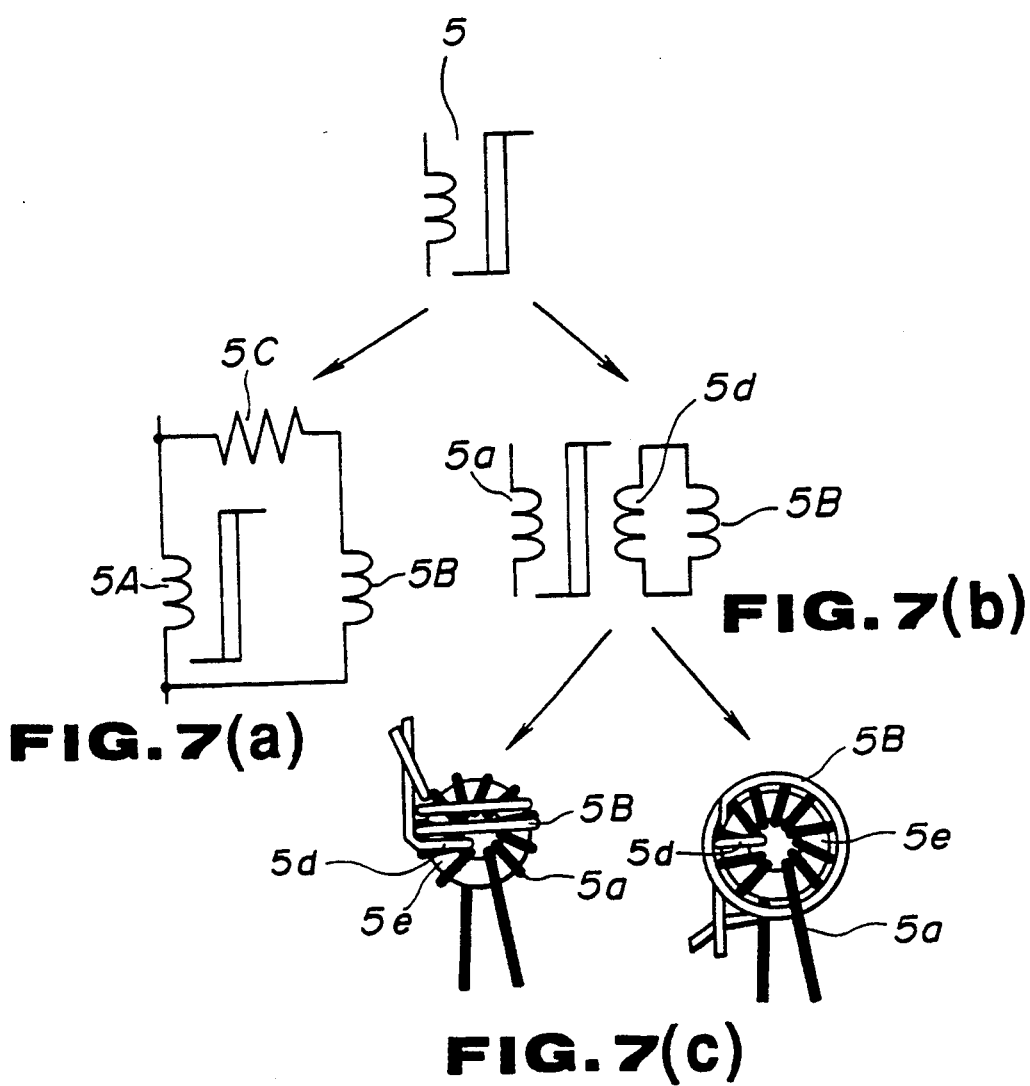
FIGS. 7(a)–(c) are a schematic diagram showing examples of the saturable inductor.
Figure 8:
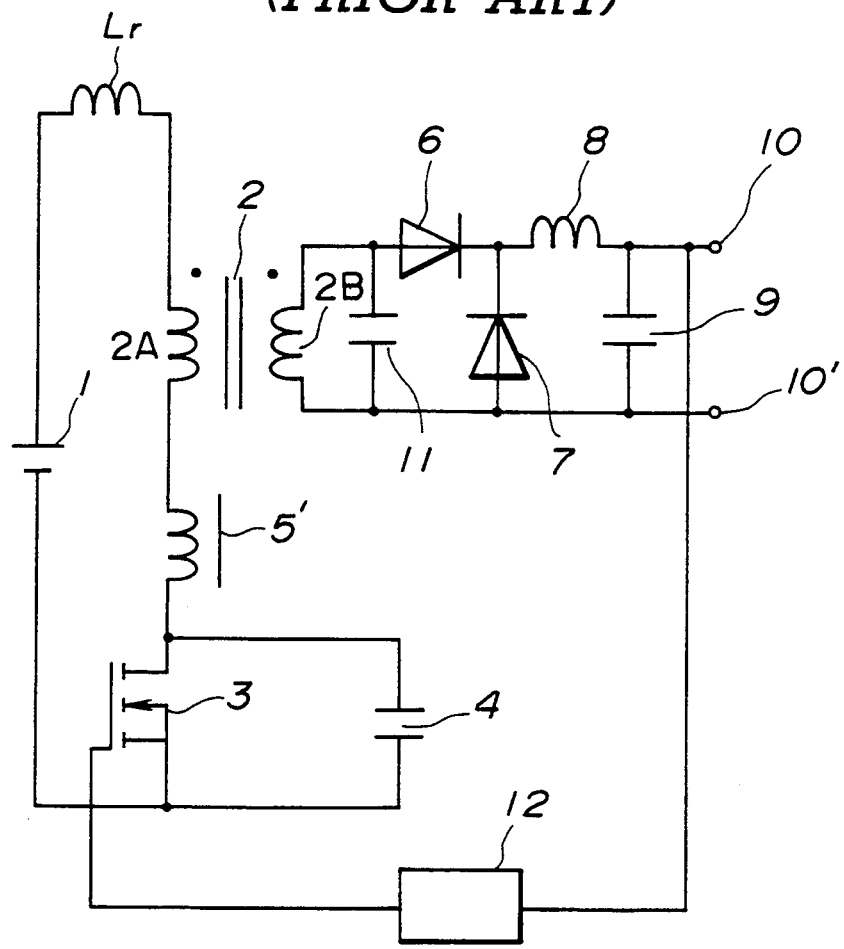
FIG. 8 is a view similar to FIG. 4, but showing a prior art resonant forward converter.
Figure 9:
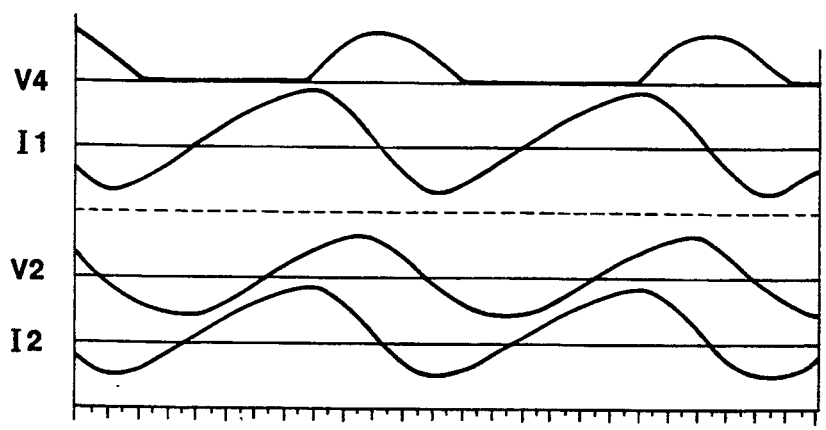
FIG. 9 is a view similar to FIG. 5, but of several portions of the prior art resonant forward converter.

The saturable inductor 5 has been described on the supposition that it had a characteristic as shown in FIG. 2, and was saturated at a predetermined current value. For obtaining such characteristic, a core for use in the saturable inductor 5 needs only have a magnetic characteristic as shown in FIG. 6. Additionally, forming a gap in the core with rectangular hysteresis can provide the same characteristic. If a saturation characteristic of the saturable inductor 5 is unsymmetrical as indicated by dotted lines in FIG. 2, the time from turn on of the switching device 3 of the resonant converter to saturation of the saturable inductor 5 in the forward direction can be shortened, reducing a dead time relative to the output with increased output power. Such unsymmetrical saturable inductor can be obtained by inserting a magnet for magnetic bias in the gap of the core, or winding a bias winding on the core, to which current bias is applied.

Further, the saturable inductor 5 has been described, with a characteristic to be magnetically saturated at a predetermined current value. Referring to FIG. 7(a), tile similar operation can be obtained by the combination of a winding 5A wound on the rectangular hysteresis core without any gap, and a linear inductor 5B. In this case, however, the saturable inductor is not saturated at a predetermined current value, but at a voltage integral value of the rectangular hysteresis core. In other words, the saturable inductor is apparently saturated at a current value of the linear inductor 5B connected in parallel, whereas it is practically saturated at a voltage integral value of the rectangular hysteresis core. However, if this apparent saturation current value is considered, the regular operation of the resonant forward converter comprising this saturable inductor is identical to the above operation.

It is to be noted that current of the linear inductor 5B varies with the input and output conditions, so that for correspondence with a description with regard to the above operation, apparent saturation current of the saturable inductor is considered to vary with the input and output conditions. With a means as shown in FIG. 7(a), since voltage drop produced in a resistance of the winding 5A by main current falls on the linear inductor 5B connected in parallel, circulating current is produced between the linear inductor 5B and the winding 5A. As output power increases circulating current becomes heavy due to an increase in DC voltage drop in the winding 5A, and passes in the direction to increase the dead time, lowering output power. For reducing this influence, it is necessary to minimally restrain circulating current by fully enlarging winding resistance of the linear inductor 5B relative to resistance of the winding 5A. For this purpose, a resistor 5C is connected in series to the linear inductor 5B.

FIG. 7(b) shows a means for solving the problem of circulating current. The saturable inductor includes, in addition to a main winding 5a, an auxiliary winding 5d to which the linear inductor 5B is connected, thus eliminating undesirable current bias due to DC voltage drop in the main winding 5a, preventing lowering of output power. Specifically, since DC voltage drop by main current fails to fall on the auxiliary winding 5d, DC current of the linear inductor 5B is null, thus eliminating bias current which lowers output power.

If the construction as shown in FIG. 7(c) is adopted, the windings and linear inductor can be integrated with the core. Referring to FIG. 7(c), the saturable inductor includes, in addition to the main winding 5a wound on the rectangular hysterisis core 5e, the auxiliary winding 5d having a single turn of winding wound through the inside of the core 5e so as to couple with the main winding 5a, and the linear inductor 5B having appropriate turns of winding wound on the outside of the core 5e so as not to couple with the main winding 5a as shown in FIG. 7(c), and both ends short-circuited.

According to such construction, the winding wound on the outside of the core 5e forms the linear inductor 5B, realizing a characteristic of non-saturated inductance of the saturable inductor 5.

The saturable inductors 5 as shown in FIG. 7(b), (c) can easily realize an apparent characteristic corresponding to one steady state which is equivalent to a characteristic as indicated by dotted lines in FIG. 2.

In the above embodiments, the saturable inductor is disposed only on the primary side. Alternatively, if the saturable inductor is also disposed on the secondary side, and connected in series to the secondary winding and the rectifier diode so as to make the saturable inductor on the secondary side to bear a part of non-saturated inductance of the saturable inductor on the primary side, peak voltage to be applied to the rectifier diode can be reduced.

What is claimed is:

1. A zero-voltage-switched forward converter, comprising:
a DC power supply;
a transformer having a primary winding connected in series to said DC power supply and a secondary winding magnetically coupled with said primary winding;
a switching device connected in series to said primary winding of said transformer;
a first resonant capacitance connected in parallel to said switching device;
a saturable inductor inserted in series in said primary winding of said transformer and said switching device, said saturable inductor having a predetermined value of inductance in a light current region and a small value of inductance at a predetermined integral voltage due to magnetic saturation, said saturable inductor having a non-saturated inductance which accumulates magnetic energy to discharge said first resonant capacitance up to zero voltage for zero voltage turning-on of said switching device;

a rectifier diode connected in series to said secondary winding of said transformer;

a free wheeling diode interposed between one end of said secondary winding of said transformer and one end of said rectifier diode;

choke input smoothing circuit means, connected in parallel to said free wheeling diode, for smoothing current passing through said secondary winding of said transformer; and control circuit means for providing a control signal to said switching device to control a conduction thereof.

2. A zero-voltage-switched forward converter as claimed in claim 1, wherein said first resonant capacitance includes an output capacitance of said switching device.

3. A zero-voltage-switched forward converter as claimed in claim 2, further including a capacitance of a resonant capacitor connected in parallel to said switching device.

4. A zero-voltage-switched forward converter as claimed in claim 1, wherein said saturable inductor includes a first winding wound on a core with a rectangular hysteresis, and a linear inductor connected in parallel to said first winding.

5. A zero-voltage-switched forward converter as claimed in claim 1, wherein said saturable inductor includes a first winding wound on a core with a rectangular hysteresis, a second winding magnetically coupled with said first winding, and a linear inductor connected in parallel to said second winding.

6. A zero-voltage-switched forward converter as claimed in claim 1, wherein said saturable inductor includes a first winding wound on a core with a rectangular hysteresis, a second winding magnetically coupled with said first winding, and a third winding connected in parallel to said second winding and failing to be magnetically coupled with said first winding.

7. A zero-voltage-switched forward converter as claimed in claim 1, further comprising:

a second resonant capacitance connected in parallel to said rectifier diode for zero voltage turning-off of said rectifier diode.

8. A zero-voltage-switched forward converter as claimed in claim 7, wherein said second resonant capacitance includes a junction capacitance of said rectifier diode.

9. A zero-voltage-switched forward converter, comprising:

a DC power supply;

a transformer having a primary winding connected in series to said DC power supply and a secondary winding magnetically coupled with said primary winding;

a switching device connected in series to said primary winding of said transformer;

a resonant capacitance connected in parallel to said switching device;

a saturable inductor connected in series to said primary winding of said transformer and said switching device, said saturable inductor having a predetermined value of inductance in a light current region and a small value of inductance at a predetermined integral voltage due to magnetic saturation, said saturable inductor including a first winding wound on a core with a rectangular hysteresis, a second winding magnetically coupled with said first winding, and a linear inductor connected in parallel to said second winding;

a rectifier diode connected in series to said secondary winding of said transformer;

a free wheeling diode interposed between one end of said secondary winding of said transformer and one end of said rectifier diode.

an output filter connected in parallel to said free wheeling diode; and a control circuit means for providing a control signal to said switching device to control a conduction thereof.

10. A zero-voltage-switched forward converter, comprising:

a DC power supply;

a transformer having a primary winding connected in series to said DC power supply and a secondary winding magnetically coupled with said primary winding;

a switching device connected in series to said primary winding of said transformer;

a resonant capacitance connected in parallel to said switching device;

a saturable inductor connected in series to said primary winding of said transformer and said switching device, said saturable inductor having a predetermined value of inductance in a light current region and a small value of inductance at a predetermined integral voltage due to magnetic saturation, said saturable inductor including a first winding wound on a core with a rectangular hysteresis, a second winding magnetically coupled with said first winding, and a third winding connected in parallel to said second winding and failing to be magnetically coupled with said first winding;

a rectifier diode connected in series to said secondary winding of said transformer;

a free wheeling diode interposed between one end of said secondary winding of said transformer and one end of said rectifier diode;

an output filter connected in parallel to said free wheeling diode; and a control circuit means for providing a control signal to said switching device to control a conduction thereof.

* * * * *